United States Patent
Iwai et al.

(10) Patent No.: US 7,886,316 B2
(45) Date of Patent: Feb. 8, 2011

(54) DISK UNIT AND DISK UNIT-INTEGRATED TELEVISION

(75) Inventors: Akio Iwai, Daito (JP); Hiroki Ishii, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1288 days.

(21) Appl. No.: 11/442,976

(22) Filed: May 31, 2006

(65) Prior Publication Data

US 2006/0277717 A1 Dec. 14, 2006

(30) Foreign Application Priority Data

May 31, 2005 (JP) ................ 2005-003882

(51) Int. Cl.
*G11B 33/02* (2006.01)
(52) U.S. Cl. ..................................... 720/647
(58) Field of Classification Search .................. 720/647
See application file for complete search history.

(56) References Cited

U.S. PATENT DOCUMENTS

| 5,220,552 | A | * | 6/1993 | Yokoi et al. .................. 720/646 |
| 5,634,798 | A | * | 6/1997 | Suh .......................... 434/307 A |
| 5,724,102 | A | * | 3/1998 | Harrison et al. ............. 348/552 |
| D416,014 | S | * | 11/1999 | Nara .......................... D14/129 |
| 6,324,147 | B2 | * | 11/2001 | Kanatani et al. ............. 720/647 |
| 6,377,451 | B1 | * | 4/2002 | Furuya .................... 361/679.32 |
| 7,055,160 | B1 | * | 5/2006 | Tan et al. ..................... 720/647 |
| 7,490,337 | B2 | * | 2/2009 | Lee ............................. 720/647 |
| 2004/0004785 | A1 | * | 1/2004 | Seo .......................... 360/97.01 |
| 2005/0034139 | A1 | * | 2/2005 | Kim .......................... 720/647 |
| 2005/0257231 | A1 | * | 11/2005 | Hibi ........................... 720/647 |

FOREIGN PATENT DOCUMENTS

| JP | 06-251573 A | 9/1994 |
| JP | 2002-050163 A | 2/2002 |
| JP | 2003-85956 A | 3/2003 |
| JP | 2004-086939 A | 3/2004 |
| JP | 2005-76691 A | 3/2005 |

OTHER PUBLICATIONS

Report of expert opinion with English translation. (Ten (10) pages).

* cited by examiner

*Primary Examiner*—Mark Blouin
(74) *Attorney, Agent, or Firm*—Crowell & Moring LLP

(57) ABSTRACT

A disk unit capable of suppressing damage of a recording surface of a disk and preventing a torsion spring from coming off is obtained. This disk unit comprises a housing portion including a disk slot, a door portion mounted on the housing portion in an openable/closable manner with respect to the disk slot and a torsion spring urging the door portion in an opening direction when the opening angle of the door portion with respect to the housing portion is larger than a prescribed angle. The torsion spring is set between a first support portion of the door portion and a second support portion of the housing portion.

16 Claims, 6 Drawing Sheets

DISK UNIT AND DISK UNIT-INTEGRATED TELEVISION

BACKGROUND OF THE INVENTION

1. Field of the Invention

The present invention relates to a disk unit and a disk unit-integrated television, and more particularly, it relates to a disk unit comprising a door portion mounted on a disk slot and a disk unit-integrated television.

2. Description of the Background Art

A disk unit comprising a door portion mounted on a disk slot for a DVD (digital versatile disk) or the like is known in general, as disclosed in Japanese Patent Laying-Open No. 2003-85956, for example. The aforementioned Japanese Patent Laying-Open No. 2003-85956 discloses a disk player (disk unit) comprising a door (door portion) rotatably mounted on a front panel (housing portion) provided with a disk slot for a DVD and a torsion coil spring for urging the door in a closing direction so that the center of rotation of the door and the center of twist of the torsion coil spring coincide with each other.

A rotational axis support structure similar to that for the door (door portion) disclosed in the aforementioned Japanese Patent Laying-Open No. 2003-85956 is also known in general, as disclosed in Japanese Patent Laying-Open No. 2005-76691, for example. The aforementioned Japanese Patent Laying-Open No. 2005-76691 discloses a rotational axis support structure comprising a door (door portion) rotatably mounted on a panel body (housing portion) provided with a disk slot for a CD (compact disk) or the like and a torsion coil spring for urging the door in a closing direction so that the center of rotation of the door and the center of twist of the torsion coil spring coincide with each other.

The disk player disclosed in the aforementioned Japanese Patent Laying-Open No. 2003-85956 is provided with the torsion coil spring for urging the door in the closing direction so that the center of rotation of the door and the center of twist of the torsion coil spring coincide with each other. If this structure is applied to a slot-in disk unit having a slot receiving a DVD with no member for protecting the recording surface of the DVD, the door (door portion) regularly urged in the closing direction comes into contact with the recording surface of the DVD when the DVD is received in and ejected from the slot. Therefore, the recording surface of the DVD may disadvantageously be damaged.

The structure disclosed in the aforementioned Japanese Patent Laying-Open No. 2005-76691 is also provided with the torsion coil spring for urging the door in the closing direction so that the center of rotation of the door and the center of twist of the torsion coil spring coincide with each other, similarly to the aforementioned Japanese Patent Laying-Open No. 2003-85956. If this structure is applied to a slot-in disk unit having a slot for receiving a CD or the like, the door (door portion) regularly urged in the closing direction comes into contact with the recording surface of the CD or the like when the CD or the like is received in and ejected from the slot. Therefore, the recording surface of the CD or the like may disadvantageously be damaged.

A door structure provided with a torsion spring whose center deviates from the center of rotation so that a door naturally opens at an angle exceeding a constant level and naturally closes at an angle below the constant level is known in general. When this structure is applied to a slot-in disk unit, it is conceivably possible to suppress damage of the recording surface of a disk. In this door structure, however, the center of the torsion spring moves upon rotation of the door, conceivably leading to such a new problem that the torsion spring easily comes off.

SUMMARY OF THE INVENTION

The present invention has been proposed in order to solve the aforementioned problems, and an object of the present invention is to provide a disk unit and a disk unit-integrated television each capable of suppressing damage of a recording surface of a disk and preventing a torsion spring from coming off.

A disk unit according to a first aspect of the present invention comprises a housing portion including a disk slot for receiving a disk, a door portion mounted on the housing portion in an openable/closable manner with respect to the disk slot for rotating about a prescribed axis and a torsion spring urging the door portion in an opening direction when the opening angle of the door portion with respect to the housing portion is larger than a prescribed angle while urging the door portion in a closing direction when the opening angle of the door portion with respect to the housing portion is smaller than the prescribed angle, the door portion includes a first support portion arranged on a side of a first end of the torsion spring, the housing portion includes a second support portion arranged on a side of a second end of the torsion spring, and the torsion spring is set between the first support portion of the door portion and the second support portion of the housing portion.

As hereinabove described, the disk unit according to the first aspect of the present invention comprises the torsion spring urging the door portion in the opening direction when the opening angle of the door portion with respect to the housing portion is larger than the prescribed angle while urging the door portion in the closing direction when the opening angle of the door portion with respect to the housing portion is smaller than the prescribed angle so that the door portion can be urged with the torsion spring not only in the closing direction but also in the opening direction, whereby the door portion urged in the opening direction with the torsion spring can be inhibited from coming into contact with a recording surface of the disk such as a DVD when the disk is received in and ejected from the disk unit. Thus, damage of the recording surface of the disk can be suppressed. Further, the door portion is provided with the first support portion arranged on the side of the first end of the torsion spring, the housing portion is provided with the second support portion arranged on the side of the second end of the torsion spring and the torsion spring is set between the first support portion of the door portion and the second support portion of the housing portion so that the first and second ends of the torsion spring are held between the first support portion of the door portion and the second support portion of the housing portion, whereby the torsion spring can be inhibited from coming off due to movement thereof or vibration applied thereto.

In the aforementioned disk unit according to the first aspect, the first support portion of the door portion is preferably formed with a first receiving portion mounted with the first end of the torsion spring, and the second support portion of the housing portion is preferably formed with a second receiving portion mounted with the second end of the torsion spring. According to this structure, the first and second ends of the torsion spring can be mounted on the first and second receiving portions of the first and second support portions of the door portion and the housing portion respectively, whereby the door portion can be easily urged with the torsion spring.

In this case, the first receiving portion of the door portion preferably includes a first receiving hole, the second receiving portion of the housing portion preferably includes a second receiving hole, the first and second ends of the torsion spring are preferably bent outward along the center of twist of the torsion spring respectively, the first end of the torsion spring is preferably inserted into the first receiving hole of the door portion, and the second end of the torsion spring is preferably inserted into the second receiving hole of the housing portion. According to this structure, the first and second ends of the torsion spring can be easily mounted on the first and second receiving portions of the door portion and the housing portion respectively.

In the aforementioned disk unit according to the first aspect, the housing portion preferably further includes a rotation support portion rotatably supporting the prescribed axis serving as the center of rotation of the door portion, and the first support portion and the torsion spring are preferably arranged between the rotation support portion and the second support portion. According to this structure, the first support portion can be inhibited from moving toward the rotation support portion, whereby the interval between the first and second support portions can be inhibited from increase. Thus, the torsion spring can be inhibited from coming off from between the first and second support portions.

In the aforementioned disk unit according to the first aspect, the housing portion preferably integrally includes a cover portion formed to cover the side of the torsion spring receiving the disk. According to this structure, the torsion spring can be inhibited from upward exposure in an opening state of the door portion, whereby a user of the disk unit can be inhibited from accidentally touching the torsion spring with his/her finger when inserting or taking out the disk into or from the disk unit. Also according to this structure, the torsion spring can be prevented from coming off, and can be inhibited from damage or the like. Further, the cover portion is so integrally formed on the housing portion that the number of components can be inhibited from increase despite the provision of the cover portion.

In the aforementioned disk unit according to the first aspect, the prescribed axis serving as the center of rotation of the door portion, the second support portion and the torsion spring are preferably arranged in the housing portion in an opening state of the door portion. According to this structure, the prescribed axis serving as the center of rotation of the door portion, the second support portion and the torsion spring can be inhibited from outward exposure from the housing portion in the opening state of the door portion, whereby the user of the disk unit can be inhibited from accidentally touching the prescribed axis serving as the center of rotation of the door portion, the second support portion and the torsion spring with his/her finger when inserting or taking out the disk into or from the disk unit. Also according to this structure, the torsion spring can be prevented from coming off, while the prescribed axis serving as the center of rotation of the door portion, the second support portion and the torsion spring can be inhibited from damage or the like.

In the aforementioned disk unit according to the first aspect, the center of twist of the torsion spring is preferably arranged at a prescribed distance from the prescribed axis serving as the center of rotation of the door portion. According to this structure, the door portion can be easily urged in the opening direction when the opening angle of the door portion with respect to the housing portion is larger than the prescribed angle, and urged in the closing direction when the opening angle of the door portion with respect to the housing portion is smaller than the prescribed angle.

In the aforementioned disk unit according to the first aspect, the door portion is preferably formed with a grip portion to be gripped by a user. According to this structure, the user can easily open the door portion by gripping the grip portion.

The aforementioned disk unit according to the first aspect is preferably stored in the housing portion provided with a television screen on the front surface thereof. According to this structure, a television integrated with the disk unit capable of inhibiting the recording surface of the disk from damage and preventing the torsion spring from coming off can be obtained.

In the aforementioned disk unit according to the first aspect, the disk slot is preferably so formed as to receive the disk substantially in parallel with the surface of the television screen. According to this structure, the thickness of the television can be inhibited from increase, so that the disk unit is particularly effectively applied to a thin television such as a liquid crystal television or a plasma television.

A disk unit-integrated television according to a second aspect of the present invention comprises a housing portion formed with a disk slot for receiving a disk on the upper surface thereof and mounted with a television screen on the front surface thereof, a door portion mounted on the housing portion in an openable/closable manner with respect to the disk slot for rotating about a prescribed axis and a torsion coil spring urging the door portion in prescribed directions, while the door portion integrally includes a first support portion arranged on a side of a first end of the torsion coil spring, the first support portion of the door portion is formed with a first receiving portion mounted with the first end of the torsion coil spring, the housing portion integrally includes a cover portion formed to cover the upper side of the torsion coil spring and a second support portion arranged on a side of a second end of the torsion coil spring, the second support portion of the housing portion is formed with a second receiving portion mounted with the second end of the torsion coil spring, the torsion coil spring is set between the first support portion of the door portion and the second support portion of the housing portion, and the center of twist of the torsion coil spring is arranged at a prescribed distance from the prescribed axis serving as the center of rotation of the door portion so that the torsion coil spring urges the door portion in an opening direction when the opening angle of the door portion with respect to the housing portion is larger than a prescribed angle while urging the door portion in a closing direction when the opening angle of the door portion with respect to the housing portion is smaller than the prescribed angle.

As hereinabove described, the disk unit-integrated television according to the second aspect of the present invention comprises the torsion coil spring urging the door portion in the opening direction when the opening angle of the door portion with respect to the housing portion is larger than the prescribed angle while urging the door portion in the closing direction when the opening angle of the door portion with respect to the housing portion is smaller than the prescribed angle so that the door portion can be urged with the torsion coil spring not only in the closing direction but also in the opening direction, whereby the door portion urged in the opening direction with the torsion coil-spring can be inhibited from coming into contact with a recording surface of the disk such as a DVD when the disk is received in and ejected from the disk unit-integrated television. Thus, damage of the recording surface of the disk can be suppressed. Further, the door portion is provided with the first support portion arranged on the side of the first end of the torsion coil spring, the housing portion is provided with the second support portion arranged on the side of the second end of the torsion coil spring and the torsion coil spring is set between the first support portion of the door portion and the second support portion of the housing portion so that the first and second ends of the torsion coil spring are held between the first support portion of the door portion and the second support portion of the housing portion, whereby the torsion coil spring can be inhibited from coming off due to movement thereof or vibration applied thereto. Further, the first and second support portions are so integrally formed on the door portion and the housing portion respectively that the number of components can be inhibited from increase despite the provision of the first and second support portions. In addition, the cover portion is formed on the housing portion to cover the upper side of the torsion coil spring so that the torsion coil spring can be inhibited from upward exposure in an opening state of the door portion, whereby a user of the disk unit-integrated television can be inhibited from accidentally touching the torsion spring with his/her finger when inserting or taking out the disk into or from the disk unit-integrated television. Also according to this structure, the torsion coil spring can be prevented from coming off, and can be inhibited from damage or the like. Further, the cover portion is so integrally formed on the housing portion that the number of components can be inhibited from increase despite the provision of the cover portion. In addition, the first support portion of the door portion is formed with the first receiving portion mounted with the first end of the torsion coil spring while the second support portion of the housing portion is formed with the second receiving portion mounted with the second end of the torsion coil spring so that the first and second ends of the torsion coil spring can be mounted on the first and second receiving portions of the first and second support portions of the door portion and the housing portion respectively, whereby the door portion can be easily urged with the torsion coil spring. Further, the center of twist of the torsion coil spring is arranged at the prescribed distance from the prescribed axis serving as the center of rotation of the door portion, whereby the door portion can be easily urged in the opening direction when the opening angle of the door portion with respect to the housing portion is larger than the prescribed angle, and urged in the closing direction when the opening angle of the door portion with respect to the housing portion is smaller than the prescribed angle.

In the aforementioned disk unit-integrated television according to the second aspect, the first receiving portion of the door portion preferably includes a first receiving hole, the second receiving portion of the housing portion preferably includes a second receiving hole, the first and second ends of the torsion coil spring are preferably bent outward along the center of twist of the torsion coil spring respectively, the first end of the torsion coil spring is preferably inserted into the first receiving hole of the door portion, and the second end of the torsion coil spring is preferably inserted into the second receiving hole of the housing portion. According to this structure, the first and second ends of the torsion coil spring can be easily mounted on the first and second receiving portions of the door portion and the housing portion respectively.

In the aforementioned disk unit-integrated television according to the second aspect, the housing portion preferably further includes a rotation support portion rotatably supporting the prescribed axis serving as the center of rotation of the door portion, and the first support portion and the torsion coil spring are preferably arranged between the rotation support portion and the second support portion. According to this structure, the first support portion can be inhibited from moving toward the rotation support portion, whereby the interval between the first and second support portions can be inhibited from increase. Thus, the torsion coil spring can be inhibited from coming off from between the first and second support portions.

In the aforementioned disk unit-integrated television according to the second aspect, the prescribed axis serving as the center of rotation of the door portion, the second support portion and the torsion coil spring are preferably arranged in the housing portion in an opening state of the door portion. According to this structure, the prescribed axis serving as the center of rotation of the door portion, the second support portion and the torsion coil spring can be inhibited from outward exposure from the housing portion in the opening state of the door portion, whereby the user of the disk unit-integrated television can be inhibited from accidentally touching the prescribed axis serving as the center of rotation of the door portion, the second support portion and the torsion coil spring with his/her finger when inserting or taking out the disk into or from the disk unit-integrated television. Also according to this structure, the torsion coil spring can be prevented from coming off, while the prescribed axis serving as the center of rotation of the door portion, the second support portion and the torsion coil spring can be inhibited from damage or the like.

In the aforementioned disk unit-integrated television according to the second aspect, the door portion is preferably formed with a grip portion to be gripped by a user. According to this structure, the user can easily open the door portion by gripping the grip portion.

In the aforementioned disk unit-integrated television according to the second aspect, the disk slot is preferably so formed as to receive the disk substantially in parallel with the surface of the television screen. According to this structure, the thickness of the television can be inhibited from increase, so that the present invention is particularly effectively applied to a thin television such as a liquid crystal television or a plasma television.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described.

The structure of a DVD player-integrated liquid crystal television 1 according to the embodiment of the present invention is described with reference to FIGS. 1 to 12.

Figure 1:
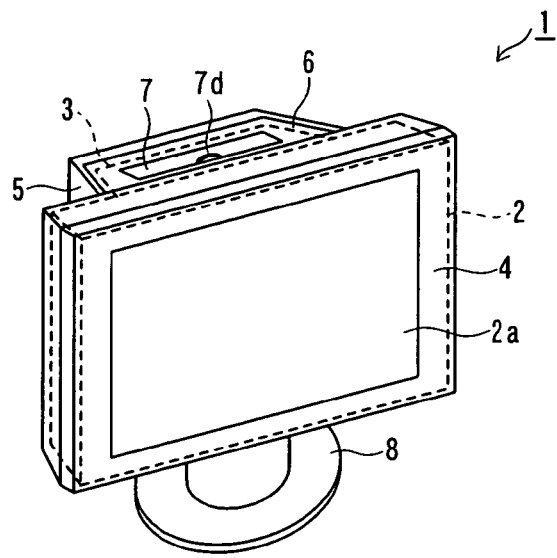
FIG. 1 is a perspective view showing the overall structure of a DVD player-integrated liquid crystal television according to an embodiment of the present invention.

The DVD player-integrated liquid crystal television 1 according to the embodiment of the present invention comprises a liquid crystal television 2, a DVD player 3, a front cabinet 4, a rear cabinet 5, an upper cabinet 6, a door portion 7 and a stand 8, as shown in FIG. 1. The front, rear and upper cabinets 4, 5 and 6 are examples of the "housing portion" in the present invention. The liquid crystal television 2 has a liquid crystal screen 2a, for displaying images thereon. The DVD player 3 has a function of reproducing a DVD 50 (see FIG. 2) inserted into the same by a user. The liquid crystal screen 2a of the liquid crystal television 2 displays images of the DVD 50 reproduced by the DVD player 3.

Figure 4:
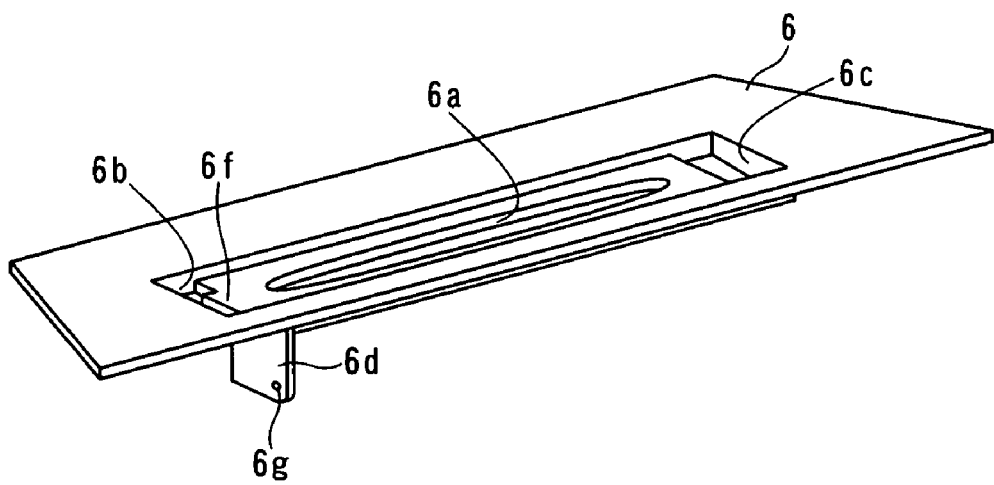
FIG. 4 is a perspective view showing the upper cabinet of the DVD player-integrated liquid crystal television according to the embodiment shown in FIG. 1 as viewed from above, for illustrating the structure thereof.
Figure 5:
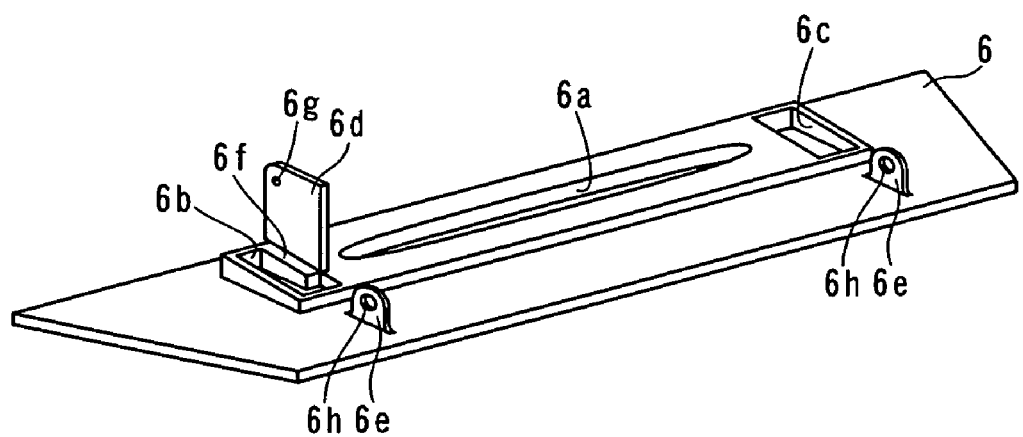
FIG. 5 is a perspective view showing the upper cabinet of the DVD player-integrated liquid crystal television according to the embodiment shown in FIG. 1 as viewed from below, for illustrating the structure thereof.

According to this embodiment, the upper cabinet 6 is integrally formed with a disk slot 6a for receiving the DVD 50 (see FIG. 2), receiving portions 6b and 6c arranged to hold the disk slot 6a therebetween and a support portion 6d as well as two rotation support portions 6e (see FIG. 5) arranged on the lower surface of the upper cabinet 6, as shown in FIGS. 4 and 5. The support portion 6d is an example of the "second support portion" in the present invention. The disk slot 6a is so formed as to receive the DVD 50 substantially in parallel with the surface of the liquid crystal screen 2a, a shown in FIGS. 1 and 2. The upper surface of the disk slot 6a is arranged downward beyond the upper surface of the upper cabinet 6, as shown in FIG. 4.

Figure 8:
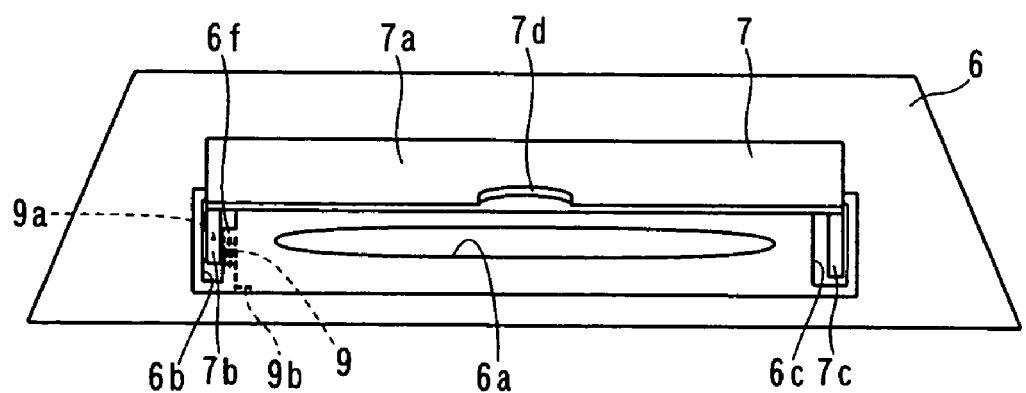
FIG. 8 is a plan view for illustrating the structures of the upper cabinet, the door portion and a torsion coil spring of the DVD player-integrated liquid crystal television according to the embodiment shown in FIG. 1.

According to this embodiment, a cover portion 6f is integrally formed on a side of the receiving portion 6b closer to the disk slot 6a to cover the upper side of a torsion coil spring 9 described later, as shown in FIGS. 4, 5 and 8. Thus, the torsion coil spring 9 can be inhibited from upward exposure in an opening state of the door portion 7 (state shown in FIG. 12), whereby the appearance of the DVD player-integrated liquid crystal television 1 can be improved. The support portion 6d is arranged between the disk slot 6a and the receiving portion 6b, as shown in FIG. 5. A receiving hole 6g is formed on a prescribed position of the support portion 6d, for receiving a second end 9b of the torsion coil spring 9. The receiving hole 6g is an example of the "second receiving portion" or the "second receiving hole" in the present invention. The two rotation support portions 6e are provided with support holes 6h respectively. The support holes 6h of the rotation support portions 6e have a function of rotatably supporting rotational axis portions 7e of the door portion 7 described later.

Figure 6:
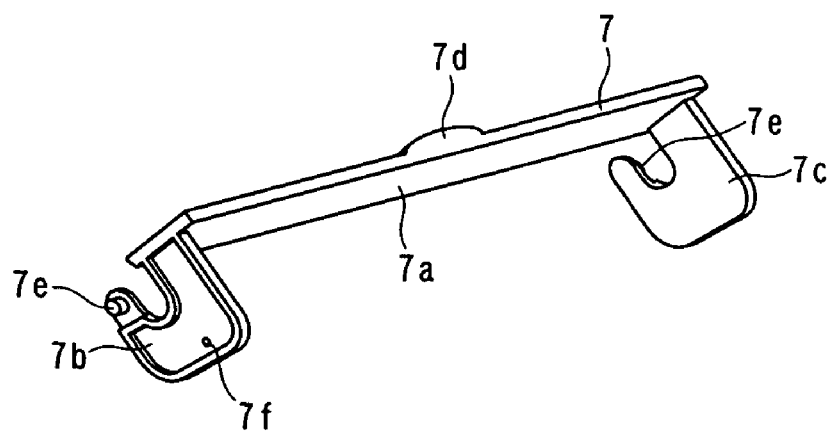
FIG. 6 is a perspective view showing the door portion of the DVD player-integrated liquid crystal television according to the embodiment shown in FIG. 1 as viewed from above, for illustrating the structure thereof.
Figure 7:
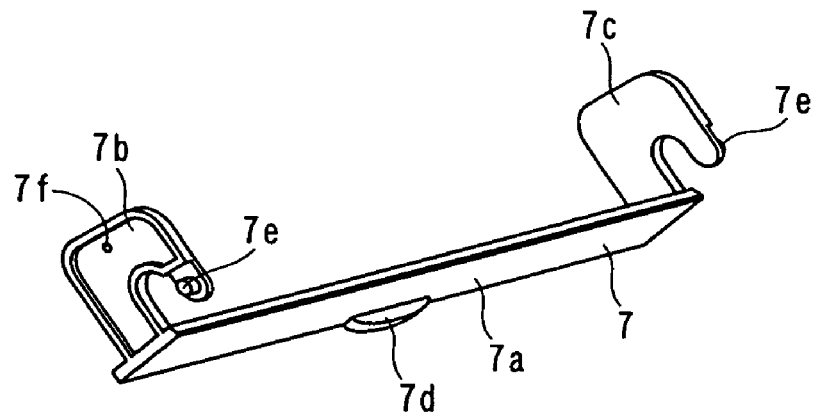
FIG. 7 is a perspective view showing the door portion of the DVD player-integrated liquid crystal television according to the embodiment-shown in FIG. 1 as viewed from below, for illustrating the structure thereof.
Figure 10:
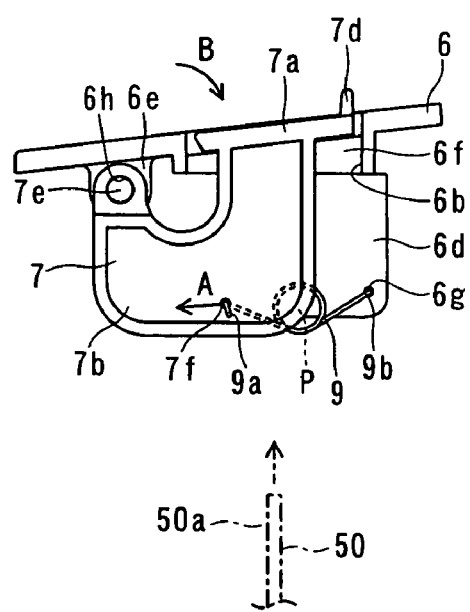
FIGS. 10 to 12 are side elevational views for illustrating the structures of the upper cabinet, the door portion and the torsion coil spring of the DVD player-integrated liquid crystal television according to the embodiment shown in FIG. 1.

The door portion 7 is constituted of a slot cover portion 7a and a pair of side walls 7b and 7c integrally provided on both side ends of the slot cover portion 7a, as shown in FIGS. 6 and 7. The side wall 7b is an example of the "first support portion" in the present invention. The slot cover portion 7a is arranged on the upper surface of the disk slot 6a (see FIG. 2) when the door portion 7 is closed with respect to the upper cabinet 6, as shown in FIG. 10. The slot cover portion 7a is formed with a protrusion 7d as shown in FIG. 6, so that the user grips this protrusion 7d in order to open the door portion 7.

Figure 2:
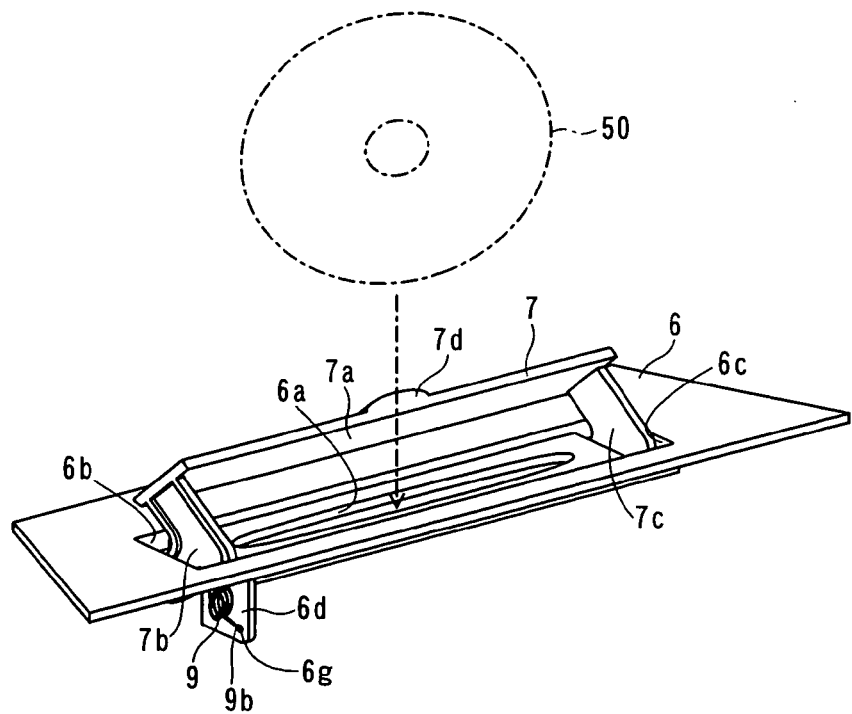
FIG. 2 is a perspective view showing an upper cabinet and a door portion of the DVD player-integrated liquid crystal television according to the embodiment shown in FIG. 1 as viewed from above, for illustrating the structures thereof.
Figure 3:
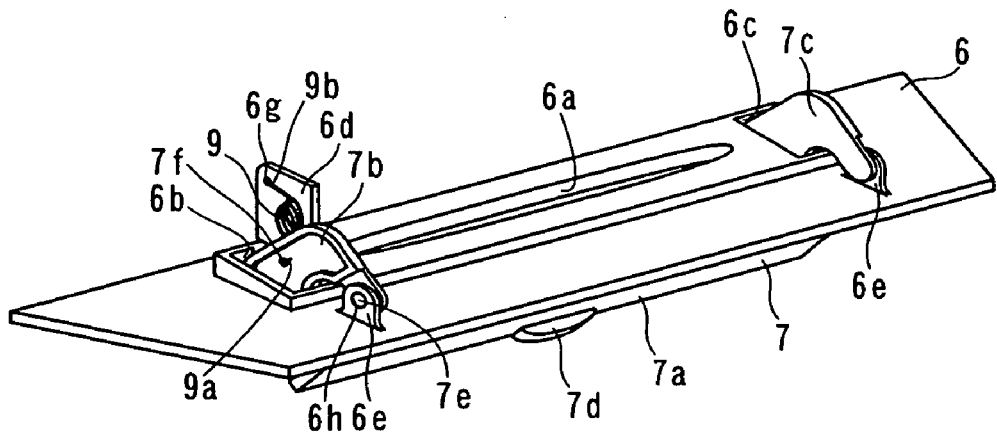
FIG. 3 is a perspective view showing the upper cabinet and the door portion of the DVD player-integrated liquid crystal television according to the embodiment shown in FIG. 1 as viewed from below, for illustrating the structures thereof.

The side walls 7b and 7c are inserted into the receiving portions 6b and 6c of the upper cabinet 6 respectively, as shown in FIGS. 2 and 3. The side walls 7b and 7c are formed with the rotational axis portions 7e respectively, as shown in FIG. 7. The rotational axis portions 7e are arranged under (in) the upper cabinet 6 in the opening state of the door portion 7. The rotational axis portions 7e are examples of the "axis" in the present invention. The rotational axis portions 7e are rotatably fitted into the support holes 6h of the upper cabinet 6, as shown in FIG. 3.

According to this embodiment, a receiving hole 7f for receiving a first end 9a of the torsion coil spring 9 is formed on a prescribed position of the side wall 7b, as shown in FIG. 6. The receiving hole 7f is an example of the "first receiving portion" or the "first receiving hole" in the present invention.

Figure 9:
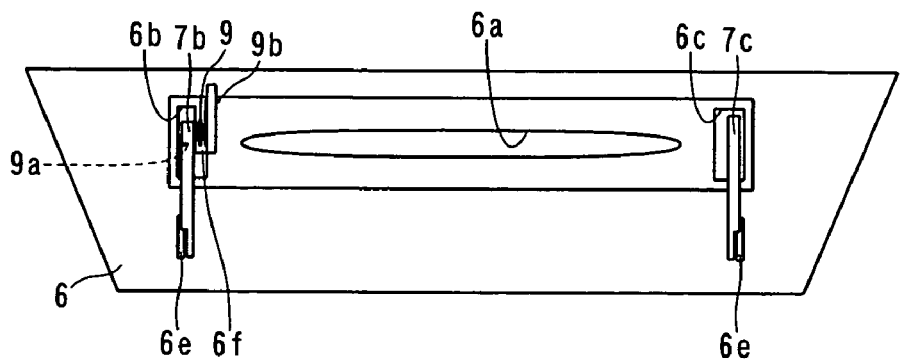
FIG. 9 shows the upper cabinet, the door portion and the torsion coil spring of the DVD player-integrated liquid crystal television according to the embodiment shown in FIG. 1 as viewed from below, for illustrating the structures thereof.

According to this embodiment, the torsion coil spring 9 for urging the door portion 7 in prescribed directions is arranged between the support portion 6d (see FIG. 3) of the upper cabinet 6 and the side wall 7b of the door portion 7, as shown in FIGS. 3 and 9. The side wall 7b of the door portion 7 and the torsion coil spring 9 are arranged between one of the rotation support portions 6e and the support portion 6d of the upper cabinet 6. The torsion coil spring 9 is an example of the "torsion spring" in the present invention. The first and second ends 9a and 9b of the torsion coil spring 9 are bent outward along the center P of twist (see FIG. 11) of the torsion coil spring 9 respectively, as shown in FIGS. 8 and 9. The first and second ends 9a and 9b of the torsion coil spring 9 are inserted into the receiving hole 7f of the side wall 7b of the door portion 7 and the receiving hole 6g of the support portion 6d respectively, as shown in FIG. 3.

According to this embodiment, the torsion coil spring 9 is arranged under (in) the upper cabinet 6 in the opening state of the door portion 9, as shown in FIG. 2.

Figure 11:
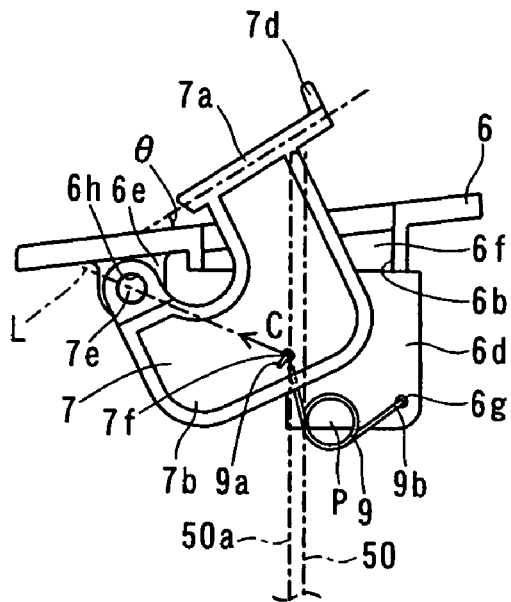
Figure 12:
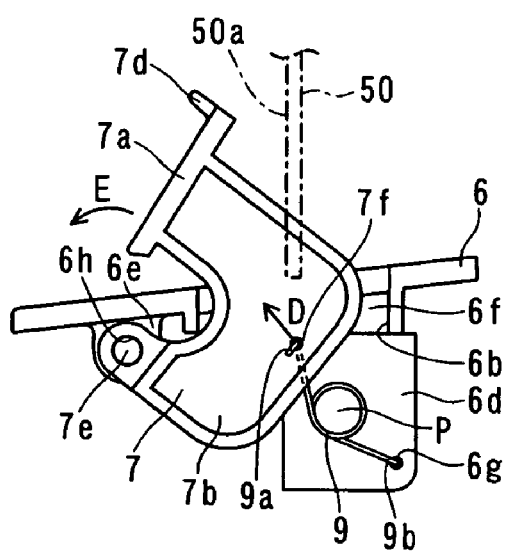

According to this embodiment, the center P of twist of the torsion coil spring 9 is arranged at a prescribed distance from the rotational axis portions 7e serving as the center of rotation of the door portion 7, as shown in FIGS. 10 to 12.

According to this embodiment, the torsion coil spring 9 has a function of urging the door portion 7 along arrow A in FIG. 10 when the opening angle of the door portion 7 with respect to the upper surface of the upper cabinet 6 is smaller than a prescribed angle θ (see FIG. 11), as shown in FIG. 10. Thus, the door portion 7 can be urged in a closing direction (along arrow B in FIG. 10) with the torsion coil spring 9. The torsion coil spring 9 also has a function of urging the door portion 7 along arrow C when the opening angle of the door portion 7 with respect to the upper surface of the upper cabinet 6 is at the prescribed angle θ, as shown in FIG. 11. In this case, the rotational axis portions 7e serving as the center of rotation of the door portion 7 are arranged on an extensional line L along arrow C, whereby no force acts on the door portion 7 in an opening direction (along arrow E in FIG. 12) or the closing direction (along arrow B in FIG. 10). The torsion coil spring 9 further has a function of urging the door portion 7 along arrow D when the opening angle of the door portion 7 with respect to the upper surface of the upper cabinet 6 is larger than the prescribed angle θ (see FIG. 11), as shown in FIG. 12. Thus, the door portion 7 can be urged in the opening direction (along arrow E in FIG. 12) with the torsion coil spring 9.

The operation of opening/closing the door portion 7 of the DVD player-integrated liquid crystal television 1 according to the embodiment of the present invention is described with reference to FIGS. 1, 2 and 10 to 12.

When the DVD player-integrated liquid crystal television 1 (see FIG. 1) receives no DVD 50, the user grips the protrusion 7d of the door portion 7 from the state shown in FIG. 10, to open the door portion 7 until the opening angle of the door portion 7 with respect to the upper surface of the upper cabinet 6 exceeds the prescribed angle θ (see FIG. 11). When the opening angle of the door portion 7 with respect to the upper surface of the upper cabinet 6 exceeds the prescribed angle θ (see FIG. 11), the torsion coil spring 9 urges the door portion 7 in the opening direction (along arrow E in FIG. 12), as shown in FIG. 12. Thereafter the user inserts the DVD 50 (see FIG. 12) into the disk slot 6a (see FIG. 2), for storing the same in the DVD player-integrated liquid crystal television 1. In this case, door portion 7 is in the opening state shown in FIG. 12 due to the urging force of the torsion coil spring 9, whereby a clearance can be formed between a recording surface 50a of the DVD 50 and the slot cover portion 7a of the door portion 7. Thus, the recording surface 50a of the DVD 50 can be inhibited from coming into contact with the door portion 7. Thereafter the user pushes down the door portion 7 until the opening angle thereof is smaller than the angle θ. Thus, the torsion coil spring 9 urges the door portion 7 in the closing direction (along arrow B in FIG. 10), as shown in FIG. 10.

When the DVD player-integrated liquid crystal television 1 (see FIG. 1) receives the DVD 50, on the other hand, the user pushes an eject button (not shown) provided on the DVD player-integrated liquid crystal television 1, for lifting up the DVD 50 as shown in FIG. 10. Then, the peripheral portion of the DVD 50 comes into contact with the lower surface of the slot cover portion 7a of the door portion 7 to open the door portion 7, as shown in FIG. 11. The opening angle of the door portion 7 with respect to the upper surface of the upper cabinet 6 exceeds the prescribed angle θ (see FIG. 11), so that the torsion coil spring 9 urges the door portion 7 in the opening direction (along arrow E in FIG. 12), as shown in FIG. 12. Thereafter the user takes out the DVD 50 (see FIG. 12) from the disk slot 6a (see FIG. 2). In this case, the door portion 7 is in the opening state shown in FIG. 12 due to the urging force of the torsion coil spring 9, whereby a clearance can be formed between the recording surface 50a of the DVD 50 and the slot cover portion 7a of the door portion 6. Thus, the recording surface 50a of the DVD 50 can be inhibited from coming into contact with the door portion 7. After taking out the DVD 50, the user pushes down the door portion 7 until the opening angle thereof is smaller than the angle θ. Thus, the torsion coil spring 9 urges the door portion 7 in the closing direction (along arrow B in FIG. 10), as shown in FIG. 10.

According to this embodiment, as hereinabove described, the DVD player-integrated liquid crystal television 1 comprises the torsion coil spring 9 urging the door portion 7 in the opening direction (along arrow E in FIG. 12) when the opening angle of the door portion 7 with respect to the upper surface of the upper cabinet 6 is larger than the prescribed angle θ (see FIG. 11) while urging the door portion 7 in the closing direction (along arrow B in FIG. 10) when the opening angle of the door portion 7 with respect to the upper surface of the upper cabinet 6 is smaller than the prescribed angle θ (see FIG. 11) so that the door portion 7 can be urged with the torsion coil spring 9 not only in the closing direction but also in the opening direction, whereby the slot cover portion 7a of the door portion 7 urged in the opening direction with the torsion coil spring 9 can be inhibited from coming into contact with the recording surface 50a of the DVD 50 when the DVD 50 is received in and ejected from the DVD player-integrated liquid crystal television 1. Thus, the recording surface 50a of the DVD 50 can be inhibited from damage.

According to this embodiment, the cover portion 6f is formed on the upper cabinet 6 to cover the upper side of the torsion coil spring 9 so that the torsion coil spring 9 can be inhibited from upward exposure in the opening state (state shown in FIG. 12) of the door portion 7, whereby the user can be inhibited from accidentally touching the torsion spring 9 with his/her finger when inserting or taking out the DVD 50 into or from the DVD player-integrated liquid crystal television 1. Also according to this structure, the torsion coil spring 9 can be prevented from coming off, and can be inhibited from damage or the like. Further, the cover portion 6f is so integrally formed on the upper cabinet 6 that the number of components can be inhibited from increase despite the provision of the cover portion 6f.

According to this embodiment, the rotational axis portions 7e forming the center of rotation of the door portion 7, the support portion 6d and the torsion coil spring 9 are arranged under (in) the upper cabinet 6 in the opening state of the door portion 7 so that the rotational axis portions 7e of the door portion 7, the support portion 6d and the torsion coil spring 9 can be inhibited from upward (outward) exposure beyond the upper cabinet 6 in the opening state of the door portion 7, whereby the user can be inhibited from accidentally touching the rotational axis portions 7e of the door portion 7, the support portion 6d and the torsion coil spring 9 with his/her finger when inserting or taking out the DVD 50 into or from the DVD player-integrated liquid crystal television 1. Also according to this structure, the torsion coil spring 9 can be prevented from coming off, while the rotational axis portions 7e of the door portion 7, the support portion 6d and the torsion coil spring 9 can be inhibited from damage or the like.

According to this embodiment, the door portion 7 is provided with the side wall 7b arranged on the side of the first end 9i a of the torsion coil spring 9 and the upper cabinet 6 is provided with the support portion 6d arranged on the side of the second end 9b of the torsion coil spring 9 while the torsion coil spring 9 is set between the side wall 7b of the door portion 7 and the support portion 6d of the upper cabinet 6 so that the first and second ends 9a and 9b of the torsion coil spring 9 are held between the side wall 7b of the door portion 7 and the support portion 6d of the upper cabinet 6, whereby the torsion coil spring 9 can be inhibited from coming off due to movement thereof or vibration applied thereto. Further, the side wall 7b and the support portion 6d are integrally formed on the door portion 7 and the upper cabinet 6 respectively, whereby the number of components can be inhibited from increase despite the provision of the side wall 7b and the support portion 6d.

According to this embodiment, the side wall 7b and the torsion coil spring 9 are so arranged between one of the rotation support portions 6e and the support portion 6d that the side wall 7b can be inhibited from moving toward the corresponding rotation support portion 6e, whereby the distance between the side wall 7b and the support portion 6d can be inhibited from increase. Thus, the torsion coil spring 9 can be inhibited from coming off from between the side wall 7b and the support portion 6d.

According to this embodiment, the center P of twist of the torsion coil spring 9 is arranged at the prescribed distance from the rotational axis portions 7e forming the center of rotation of the door portion 7, whereby the torsion coil spring 9 can easily urge the door portion 7 in the opening direction (along arrow E in FIG. 12) when the opening angle of the door portion 7 with respect to the upper cabinet 6 is larger than the prescribed angle θ (see FIG. 11) while easily urging the door portion 7 in the closing direction (along arrow B in FIG. 10) when the opening angle of the door portion 7 with respect to the upper cabinet 6 is smaller than the prescribed angle θ (see FIG. 11).

According to this embodiment, the disk slog 6a is so formed as to receive the DVD 50 substantially in parallel with the surface of the liquid crystal screen 2a, whereby the thickness of the liquid crystal television 2 can be inhibited from increase.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment of the present invention is applied to the DVD player-integrated liquid crystal television 1 comprising the door portion 7 mounted on the disk slot 6a as an exemplary disk unit and an exemplary disk unit-integrated television according to the present invention, the present invention is not restricted to this but is also applicable to a disk unit such as a DVD player (disk unit) or a disk unit for a CD or the like other than the DVD stored in a television other than the liquid crystal television, for example, so far as the disk unit and the disk unit-integrated television comprise the door portion 7 mounted on the disk slot 6a.

While the cover portion 6f is provided only on the receiving portion 6b of the upper cabinet 6 in the aforementioned embodiment, the present invention is not restricted to this but the cover portion 6f may alternatively be provided on each of the receiving portions 6b and 6c of the upper cabinet 6. In this case, dust or the like can be inhibited from penetrating through the receiving portions 6b and 6c.

While the disk slot 6a is provided on the upper surface of the DVD player-integrated liquid crystal television 1 in the aforementioned embodiment, the present invention is not restricted to this but the disk slot 6a may alternatively be provided on a side surface or a lower portion of the front surface of the DVD player-integrated liquid crystal television 1.

What is claimed is:

1. A disk unit comprising:
a housing portion including a disk slot for receiving a disk;
a door portion mounted on said housing portion in an openable/closable manner with respect to said disk slot for rotating about a prescribed axis; and
a torsion spring urging said door portion in an opening direction when the opening angle of said door portion with respect to said housing portion is larger than a prescribed angle while urging said door portion in a closing direction when the opening angle of said door portion with respect to said housing portion is smaller than said prescribed angle, wherein
said door portion includes a first support portion arranged on a side of a first end of said torsion spring,
said housing portion includes a second support portion arranged on a side of a second end of said torsion spring, and
said torsion spring is set between said first support portion of said door portion and said second support portion of said housing portion.

2. The disk unit according to claim 1, wherein
said first support portion of said door portion is formed with a first receiving portion mounted with said first end of said torsion spring, and
said second support portion of said housing portion is formed with a second receiving portion mounted with said second end of said torsion spring.

3. The disk unit according to claim 2, wherein
said first receiving portion of said door portion includes a first receiving hole,
said second receiving portion of said housing portion includes a second receiving hole,
said first and second ends of said torsion spring are bent outward along the center of twist of said torsion spring respectively,
said first end of said torsion spring is inserted into said first receiving hole of said door portion, and
said second end of said torsion spring is inserted into said second receiving hole of said housing portion.

4. The disk unit according to claim 1, wherein
said housing portion further includes a rotation support portion rotatably supporting said prescribed axis serving as the center of rotation of said door portion, and
said first support portion and said torsion spring are arranged between said rotation support portion and said second support portion.

5. The disk unit according to claim 1, wherein
said housing portion integrally includes a cover portion formed to cover the side of said torsion spring receiving said disk.

6. The disk unit according to claim 1, wherein
said prescribed axis serving as the center of rotation of said door portion, said second support portion and said torsion spring are arranged in said housing portion in an opening state of said door portion.

7. The disk unit according to claim 1, wherein
the center of twist of said torsion spring is arranged at a prescribed distance from said prescribed axis serving as the center of rotation of said door portion.

8. The disk unit according to claim 1, wherein
said door portion is formed with a grip portion to be gripped by a user.

9. The disk unit according to claim 1, stored in said housing portion provided with a television screen on the front surface thereof.

10. The disk unit according to claim 9, wherein
said disk slot is so formed as to receive said disk substantially in parallel with the surface of said television screen.

11. A disk unit-integrated television comprising:
a housing portion formed with a disk slot for receiving a disk on the upper surface thereof and mounted with a television screen on the front surface thereof;
a door portion mounted on said housing portion in an openable/closable manner with respect to said disk slot for rotating about a prescribed axis; and
a torsion coil spring urging said door portion in prescribed directions, wherein
said door portion integrally includes a first support portion arranged on a side of a first end of said torsion coil spring,
said first support portion of said door portion is formed with a first receiving portion mounted with said first end of said torsion coil spring,
said housing portion integrally includes a cover portion formed to cover the upper side of said torsion coil spring and a second support portion arranged on a side of a second end of said torsion coil spring, said second support portion of said housing portion is formed with a second receiving portion mounted with said second end of said torsion coil spring, said torsion coil spring is set between said first support portion of said door portion and said second support portion of said housing portion, and the center of twist of said torsion coil spring is arranged at a prescribed distance from said prescribed axis serving as the center of rotation of said door portion so that said torsion coil spring urges said door portion in an opening direction when the opening angle of said door portion with respect to said housing portion is larger than a prescribed angle while urging said door portion in a closing direction when the opening angle of said door portion with respect to said housing portion is smaller than said prescribed angle.

12. The disk unit-integrated television according to claim 11, wherein said first receiving portion of said door portion includes a first receiving hole, said second receiving portion of said housing portion includes a second receiving hole, said first and second ends of said torsion coil spring are bent outward along the center of twist of said torsion coil spring respectively, said first end of said torsion coil spring is inserted into said first receiving hole of said door portion, and said second end of said torsion coil spring is inserted into said second receiving hole of said housing portion.

13. The disk unit-integrated television according to claim 11, wherein said housing portion further includes a rotation support portion rotatably supporting said prescribed axis serving as the center of rotation of said door portion, and said first support portion and said torsion coil spring are arranged between said rotation support portion and said second support portion.

14. The disk unit-integrated television according to claim 11, wherein said prescribed axis serving as the center of rotation of said door portion, said second support portion and said torsion coil spring are arranged in said housing portion in an opening state of said door portion.

15. The disk unit-integrated television according to claim 11, wherein said door portion is formed with a grip portion to be gripped by a user.

16. The disk unit-integrated television according to claim 11, wherein said disk slot is so formed as to receive said disk substantially in parallel with the surface of said television screen.

* * * * *